Aug. 2, 1955     C. DE GANAHL ET AL     2,714,414
FABRICATION OF PIPE FROM GLASS FIBER AND PLASTIC MATERIAL
Filed Aug. 17, 1950     2 Sheets-Sheet 1

INVENTORS
Carl de Ganahl
John A. Grant
Clare E. Bacon
BY
Pennie Edmonds Morton & Barrows
ATTORNEYS Aug. 2, 1955 C. DE GANAHL ET AL 2,714,414
FABRICATION OF PIPE FROM GLASS FIBER AND PLASTIC MATERIAL
Filed Aug. 17, 1950 2 Sheets-Sheet 2

INVENTORS
Carl de Ganahl
John A. Grant
BY Clare E. Bacon
Pennie Edmonds Morton & Barrows
ATTORNEYS United States Patent Office 2,714,414
Patented Aug. 2, 1955

2,714,414

FABRICATION OF PIPE FROM GLASS FIBER AND PLASTIC MATERIAL

Carl De Ganahl, Greenlawn, N. Y., and John A. Grant, Granville, and Clare E. Bacon, Newark, Ohio; said Grant and said Bacon assignors to Owens-Corning Fiberglas Corporation, Toledo, Ohio, a corporation of Delaware Application August 17, 1950, Serial No. 180,066

17 Claims. (Cl. 154—1.8)

This invention relates to the manufacture of pipe and more particularly to the fabrication of pipe from glass fiber strands or yarns and plastic material in an economical and commercially practicable manner.

Pipes of various sizes are used in a multitude of applications for conducting fluids. Such pipes have heretofore been made of metal primarily. Most metals are relatively heavy and are moreover subject to corrosion to a greater or lesser extent, depending upon the particular fluids which are transmitted therethrough.

It is the object of the present invention to provide pipes of varying sizes which are strong and rigid, yet light in weight and not subject to corrosion.

Another object of the invention is the provision of a method of an apparatus for fabricating pipe of glass fiber yarns, strands, threads or filaments and a plastic material which initially is liquid and subsequently sets or hardens to produce a firm body.

Figure 1:
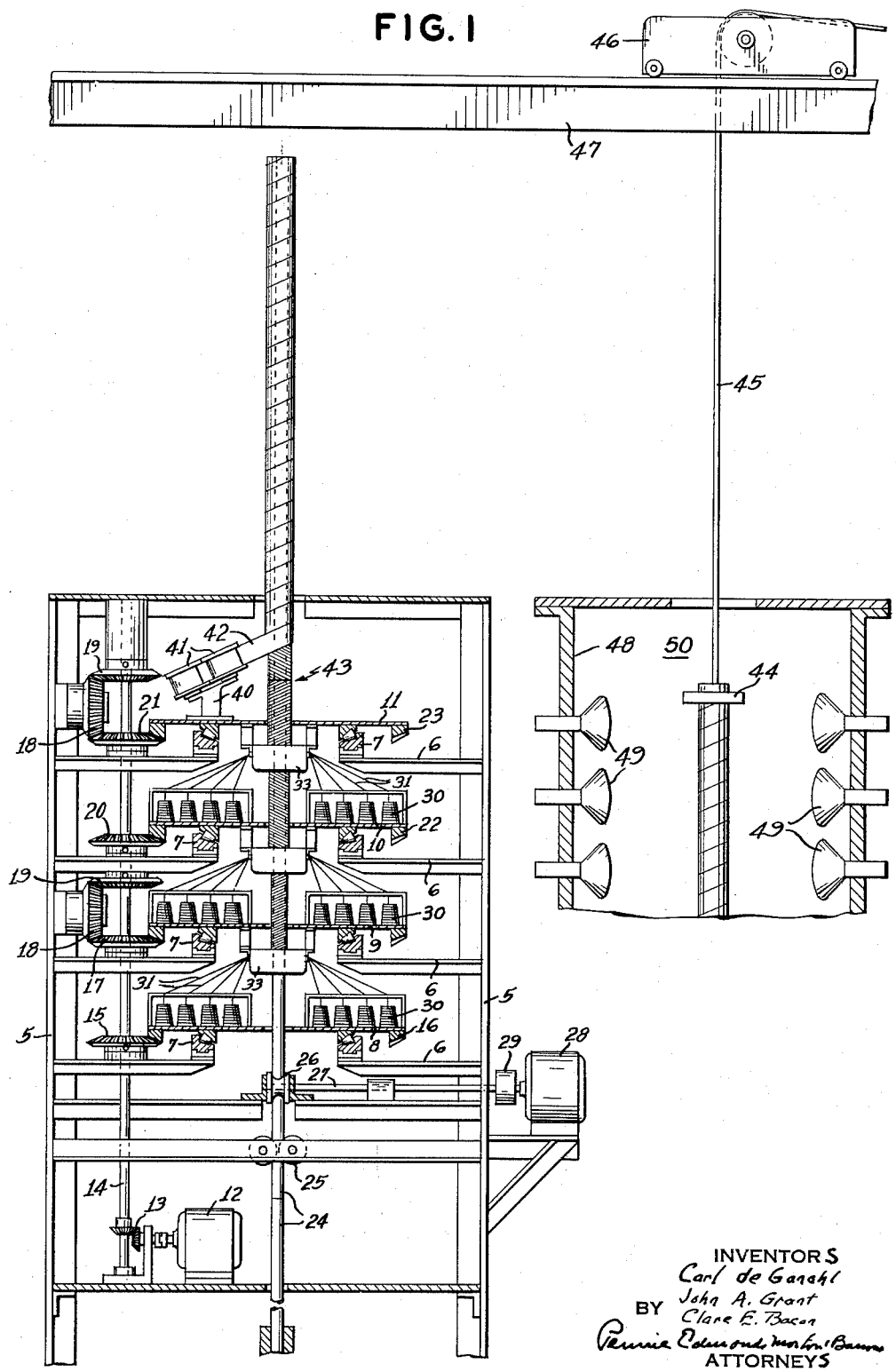
Figure 2:
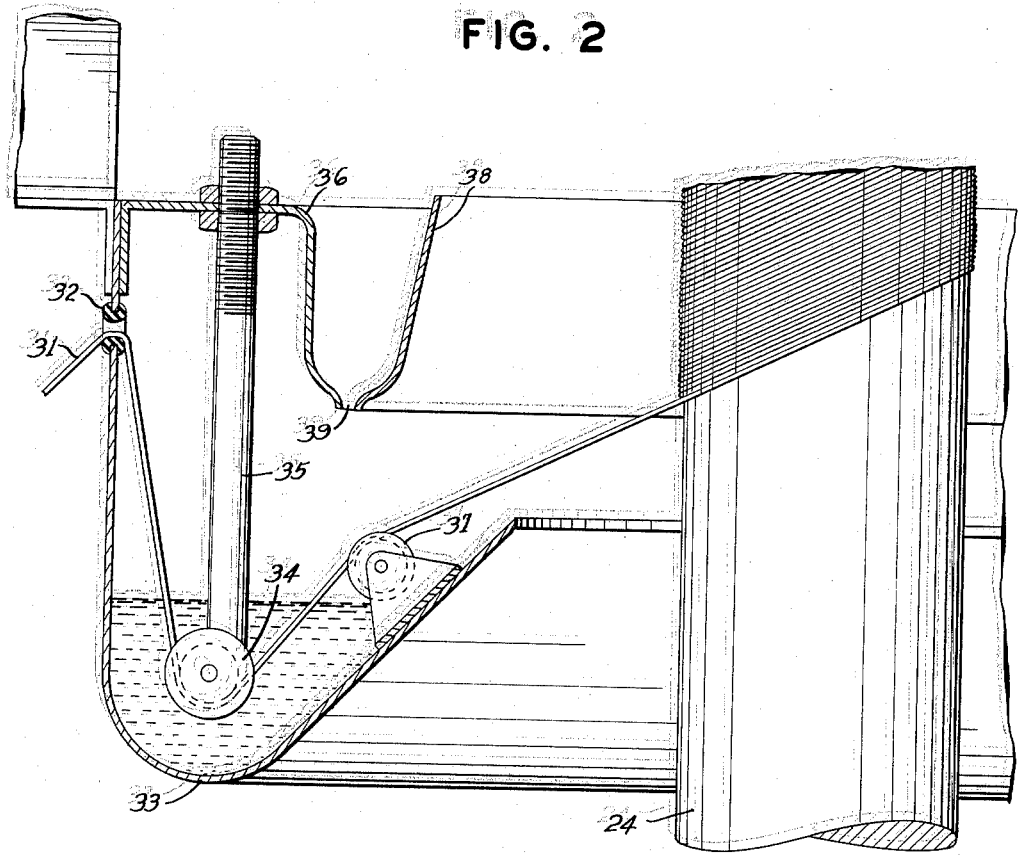
Figure 3:
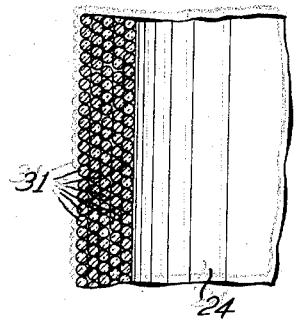

Other objects and advantages of the invention will be apparent as it is better understood by reference to the following specification and the accompanying drawing, in which Fig. 1 is a sectional view in elevation, illustrating an apparatus suitable for the practice of the present invention;

Fig. 2 is an enlarged sectional view illustrating the application of the plastic material to the glass fiber thread and the laying of the thread upon a mandrel; and Fig. 3 is an enlarged sectional view of the finished pipe, it being understood that the size of the threads as shown is magnified for the purpose of clarity.

The present invention depends upon the fabrication of pipe by winding threads or yarn consisting of strands of glass fibers about a mandrel, the threads being dipped, prior to winding, in a suitable plastic material which is adapted to be hardened by the application of heat or otherwise. When the pipe is completed, it may be withdrawn from the mandrel and is ready for use in many applications for which only metal pipe has been available heretofore.

In carrying out the invention, a mandrel of metal such as steel, for example, with a highly polished and preferably chromium-plated outer surface, is fed upwardly by suitable driving rolls. A succession of such mandrels is thus advanced upwardly in a continuous manner. At a suitable point as the mandrel advances upwardly, a plurality of strands of glass fibers are withdrawn from spools or boxes carrying such material, dipped momentarily in a plastic material in liquid form, and immediately wound helically upon the mandrel at an angle to the axis thereof. The preferred angle is 63.45°, which is adapted to give the pipe twice the strength circumferentially that it has lengthwise. However, the angle of application of the threads may vary from the preferred figure.

To accomplish the winding, a plurality of spools or boxes of glass fiber thread are disposed upon a table rotating about the mandrel at relatively low speed. The strands from the spools or boxes are withdrawn continuously, and after application of the plastic material thereto, are wound about the mandrel as the table spins. Two or more such tables may be superposed and rotated alternately in opposite directions to apply a plurality of layers of the glass strands carrying the plastic material to the mandrel, depending upon the desired thickness of the finished pipe.

The plastic material employed for the purpose of the present invention may vary. Numerous synthetic resinous compounds adapted for the purpose are available. It is preferable to employ thermosetting resins of the polymerization type which are readily converted from a monomeric stage by the action of a low degree of heat and little or no pressure. Such resins known as contact resins may be readily applied to the strand in a liquid monomeric form or as a partially polymerized solvent solution. These resins may consist of polymers and copolymers from such groups as allyl compounds and their derivatives, polyester resins, styrene derivatives, or acrylic acid and ester derivatives, all having sufficient reactive groups to form a cross-linkage responsible for the thermosetting properties.

Such plastics are particularly suitable for application in the manner described herein. The plastic material may be supplied from a suitable source thereof continuously to a circular trough surrounding the mandrel through which the strands of glass fibers are directed. When the mandrel is completely filled to the desired thickness with the strands of glass and plastic, it is covered with a material such as cellophane, paper or the like applied by winding from a reel in a manner similar to the application of the threads. The material on the mandrel is then severed from that on the succeeding mandrel manually or otherwise, so that the uppermost mandrel with the material wound thereon can be removed and deposited in a suitable chamber or oven where the temperature is raised to the point requisite to secure setting or hardening of the plastic material. This temperature will be in the neighborhood of 230° F., although the temperature may vary over a wide range, depending upon the particular type of plastic material employed. Usually a heating period of from 5 to 10 minutes is sufficient to cure the plastic material, but this period is also subject to variation.

To facilitate removal of the mandrel from the finished pipe, the mandrel is preferably slightly tapered. Thus, by the application of a suitable force, the mandrel may be removed from the finished pipe which is then ready for shipment or use. Such pipe may be provided with threads permitting the use of couplings, or they may be connected in any desired manner. The pipe is relatively light compared with pipe made from iron or steel, copper or the like. It is nevertheless strong and sufficiently rigid, with considerable elasticity, however. The pipe is not subject to corrosion, and is adapted for many uses in which corrosive liquids, such for example as sea water, or corrosive gases are conveyed.

Referring to the drawing, 5 indicates a suitable frame of steel or other metal supporting the mechanism. The frame carries brackets 6 to afford a support for roller bearings 7 on which the tables 8, 9, 10 and 11 are mounted for rotation. The tables are driven from a motor 12 through gears 13 and a shaft 14. A bevel gear 15 on the shaft 14 engages a circular rack 16 on the table 8. A bevel gear 17 is loose on the shaft 14 and is driven through gearing 18 from the shaft 14 so that it rotates in the reverse direction to the rotation of the shaft 14. The bevel gear 17 engages a circular rack 19 on the table 9 which consequently revolves in the reverse direction to that of the table 8. The shaft 14 carries a bevel gear 20 engaging a circular rack 22 to drive the table 10 in the direction of the table 8. The table 11 is rotated in the direction of the table 9 through a gear 21 loosely mounted on the shaft 14 and engaging a circular rack 23 carried by the table 11. The gear 21 is driven through gearing 18' from the shaft 14 in the manner described in connection with the drive for table 9.

A succession of mandrels 24 are introduced at the bottom of the frame and engage rollers 25 and thereafter rollers 26 which hold the mandrels rigidly as they are moved upwardly. One of the rollers 26 is driven through a shaft 27 from motor 28 through a speed reducing gear 29 so that the mandrels are moved upwardly and successively at a predetermined rate. They pass through openings in the center of each of the tables 8, 9, 10 and 11.

Each of the tables 8, 9 and 10 carries a plurality of spools 30 of glass fiber thread or strand, and the threads 31 are directed through an opening 32 in the wall of an annular trough 33 which contains a fluent body of the plastic material, as shown in Fig. 2. Instead of spools I may employ boxes containing balls of the thread which may be unwound in the same manner as the spools. The threads pass under a porcelain guide 34 supported in a cover 36 extending over the trough. The threads then pass over a porcelain guide 37 and are wound upon the mandrel 24 in the manner hereinbefore described. The cover 36 has a trough 38 into which the plastic material is fed from any suitable source from which it escapes through an opening 39 into the trough 33 at a rate which maintains sufficient plastic material in the trough 33 to cover the thread 31 as it passes under the guide 34. Thus, the thread is coated with the plastic material before it is applied to the mandrel 24.

Any desired number of tables such as 8, 9 and 10 may be employed. Three are illustrated in the drawing, which thus provides for the application of three layers of plastic-coated thread to the mandrel successively. If additional layers are required, additional tables must be provided.

The table 11 carries a bracket 40 supporting a spool 41 on which is maintained a supply of tape 42. The tape may be of cellophane, paper or other suitable material adapted to protect the resin on the mandrel from the cure-inhibiting effects of air during the subsequent treatment. Most resins of the polyester type are "air-sensitive" in curing. Resins will often set in the presence of air but are weak and soft. The object of employing cellophane or other tape here is to exclude air during the curing of the resin. The tape is laid on the coated mandrel helically as indicated in Fig. 1 of the drawing. When one of the mandrels 24 has been completely coated and covered with tape, it is severed from the succeeding mandrel, manually or otherwise, at the joint indicated at 43. When severed, the mandrel may be engaged by a clutch member 44 on a cable 45 carried by a traveling crane 46 mounted on rails 47. This permits the transfer of the completed pipe on the mandrel to a chamber 50, the walls 48 of which support a plurality of radiant heating lamps 49 which are adapted to raise the temperature within the chamber to the desired point and thus heat the coating on the mandrel to the point where the plastic material will set or harden. After a period of approximately 5 to 10 minutes, the coated mandrel is withdrawn from the chamber 50 and the finished pipe may then be stripped from the mandrel 24, the latter being returned to the apparatus for subsequent coating.

The resin may also be cured by introducing heat to the inside of the covered mandrel. This may be accomplished by passing steam or other heated fluid through the mandrel and thus curing the resin from the inside. This method of cure has the advantage of tending to expand the mandrel somewhat before the resin has set or cured. After the pipe is cured the mandrel may be cooled and thus caused to shrink away from the pipe allowing easier stripping of the pipe from the mandrel. A further advantage of this method is realized when resins having a tendency to shrink when cured are employed. Curing such resins from the inside minimizes the tendency of the pipe to cleave to the mandrel so that the pipe can more readily be removed therefrom.

As shown in Fig. 3, the finished pipe consists of a plurality of layers of the thread 31 bonded by the plastic material. Depending upon the size of the pipe, the number of layers and consequently the thickness of the wall of the pipe will vary. Thus, for example, a two-inch internal diameter pipe may have a wall thickness of .03 to .05 inch. A pipe having an internal diameter of six inches may have a wall thickness varying from .055 to .085. A pipe having an internal diameter of twelve inches may have a wall thickness of .165 inch. Of course, these are merely illustrative and are subject to variation. The thickness of the wall will depend upon the number of layers of thread 31 which are applied during the operation of the apparatus as hereinbefore described. Any pipe can be designed to any bursting pressure desired by the number of layers of thread used. Thus it will be seen that the pipe as described may be made sufficiently strong for most purposes and, being relatively light, may be handled easily as compared with metal pipes which are of much greater weight.

Various changes may be made in the details of the structure and apparatus as well as in the procedure without departing from the invention or sacrificing the advantages thereof.

We claim:

1. The method of fabricating pipe which comprises advancing a mandrel upwardly, continuously applying upon the upwardly advancing mandrel a plurality of helical layers of glass thread coated with a fluent plastic material, treating the mandrel with the layers thereon to set the plastic material, and subsequently removing the mandrel therefrom.

2. The method of fabricating pipe which comprises advancing a mandrel upwardly, continuously applying upon the upwardly advancing mandrel, at an angle of approximately 63.45°, a plurality of helical layers of glass thread coated with a fluent plastic material, treating the mandrel with the layers thereon to set the plastic material, and subsequently removing the mandrel therefrom.

3. The method of fabricating pipe which comprises advancing a mandrel upwardly, continuously applying upon the upwardly advancing mandrel a plurality of helical layers of glass thread coated with a fluent plastic material, wrapping the layers of thread with a tape, treating the mandrel with the layers thereon to set the plastic material, and subsequently removing the mandrel therefrom.

4. The method of fabricating pipe which comprises advancing a mandrel upwardly, continuously applying in reverse directions upon the upwardly advancing mandrel a plurality of helical layers of glass thread coated with a fluent plastic material, treating the mandrel with the layers thereon to set the plastic material, and subsequently removing the mandrel therefrom.

5. The method of fabricating pipe which comprises advancing a plurality of mandrels upwardly and successively at a predetermined rate, continuously applying to each advancing mandrel a plurality of continuous layers of glass thread carrying a plastic material, successively separating the uppermost mandrel with the layers thereon from the succeeding upwardly advancing mandrels, treating the mandrels with the layers thereon to set the plastic material, and subsequently removing the mandrels therefrom.

6. The method of fabricating pipe which comprises advancing a plurality of mandrels upwardly and successively at a predetermined rate, feeding glass thread, dipping the thread in a liquid plastic material and winding the thread carrying the plastic material in a plurality of continuous helical layers upon each advancing mandrel, successively separating the uppermost mandrel with the layers thereon from the succeeding upwardly advancing mandrels, treating the mandrels with the layers thereon to set the plastic material, and subsequently removing the mandrels therefrom.

7. The method of fabricating pipe which comprises advancing a plurality of mandrels upwardly and successively at a predetermined rate, feeding glass thread, dipping the thread in a liquid plastic material to secure a coating of said material thereon and winding said coated thread in a plurality of continuous helically applied layers upon each advancing mandrel at an angle of approximately 63.45°, successively separating the uppermost mandrel with the layers thereon from the succeeding upwardly advancing mandrels, treating the mandrels with the layers thereon to set the plastic material, and subsequently removing the mandrels therefrom.

8. The method of fabricating pipe which comprises advancing a plurality of mandrels upwardly and succesively at a predetermined rate, feeding glass thread, dipping the thread in a liquid plastic material to secure a coating of said material thereon and winding said coated thread in a plurality of continuous helically applied layers upon each advancing mandrel, wrapping the layers of thread with tape, successively separating the uppermost mandrel with the layers thereon from the succeeding upwardly advancing mandrels, treating the mandrels with the layers thereon to set the plastic material, and subsequently removing the mandrels therefrom.

9. The method of fabricating pipe which comprises advancing a plurality of mandrels upwardly and successively at a predetermined rate, feeding glass thread, dipping the thread in a liquid plastic material to secure a coating of said material thereon and winding said coated thread in a plurality of continuous helically applied layers upon each advancing mandrel in reverse directions, successively separating the uppermost mandrel with the layers thereon from the succeeding upwardly advancing mandrels, treating the mandrels with the layers thereon to set the plastic material, and subsequently removing the mandrels therefrom.

10. In an apparatus for fabricating pipe, powerdriven means for advancing a mandrel upwardly at a uniform rate, a rotatable table having a central opening for the mandrel, means for rotating the table, means for supporting a plurality of filament carriers on the table, a receptacle and means therein to guide filaments from the spools through the receptacle and onto the mandrel.

11. In an apparatus for fabricating pipe, powerdriven means for advancing a mandrel upwardly at a uniform rate, a plurality of rotatable tables each having a central opening for the mandrel, means for rotating the tables, means for supporting a plurality of filament carriers on the tables, receptacles and means therein for guiding filaments from the spools through the receptacles and onto the mandrel.

12. In an apparatus for fabricating pipe, powerdriven means for advancing a mandrel upwardly at a uniform rate, a plurality of rotatable tables each having a central opening for the mandrel, means for rotating the tables alternately in reverse directions, means for supporting a plurality of filament carriers on the tables, receptacles and means therein for guiding filaments from the spools through the receptacles and onto the mandrel.

13. In an apparatus for fabricating pipe, power-driven means for advancing a mandrel upwardly at a uniform rate, a plurality of rotatable tables each having a central opening for the mandrel, means for rotating the tables, means for supporting a plurality of filament spools on the tables, receptacles and means therein for guiding filaments from the spools through the receptacles and onto the mandrel, and means on one of the tables to feed a tape to the mandrel.

14. In an apparatus for fabricating pipe, power-driven means for advancing a mandrel upwardly at a uniform rate, a plurality of rotatable tables each having a central opening for the mandrel, means for rotating the tables, means for supporting a plurality of filament spools on the tables, receptacles and means therein for guiding filaments from the spools through the receptacles and onto the mandrel, a heating oven and means for transferring the mandrel with the filaments thereon to the heating oven.

15. In an apparatus for fabricating pipe, power-driven means for advancing a mandrel upwardly at a uniform rate, a plurality of rotatable tables each having a central opening through which the mandrel travels upwardly, the tables being one above the other and rotated alternately in opposite directions at a rate fixed in ratio to the rate of upward movement of the mandrel, a plurality of glass fiber yarn carriers on each of the tables, a trough adapted to contain a supply of plastic material, and means for guiding the yarn through the plastic material in the trough and for directing the coated yarn upon the mandrel so that it is wrapped helically thereon as the mandrel advances upwardly, the yarn from successive tables being applied in opposite directions.

16. In an apparatus for fabricating pipe, power-driven means for advancing a mandrel upwardly at a uniform rate, a plurality of rotatable tables each having a central opening through which the mandrel travels upwardly, the tables being one above the other and rotated alternately in opposite directions at a rate fixed in ratio to the rate of upward movement of the mandrel, a plurality of glass fiber yarn carriers on each of the tables, a trough adapted to contain a supply of plastic material, means for guiding the yarn through the plastic material in the trough and for directing the coated yarn upon the mandrel so that it is wrapped helically thereon as the mandrel advances upwardly, the yarn from successive tables being applied in opposite directions, and means for wrapping a tape helically about the layer of yarn on the mandrel.

17. In an apparatus for fabricating pipe, power-driven means for advancing a mandrel upwardly at a uniform rate, a plurality of rotatable tables each having a central opening through which the mandrel travels upwardly, the tables being one above the other and rotated alternately in opposite directions at a rate fixed in ratio to the rate of upward movement of the mandrel, a plurality of glass fiber yarn carriers on each of the tables, a trough adapted to contain a supply of plastic material, means for guiding the yarn through the plastic material in the trough and for directing the coated yarn upon the mandrel so that it is wrapped helically thereon as the mandrel advances upwardly, the yarn from successive tables being applied in opposite directions, a heating chamber, and means for transferring the wrapped mandrel to the chamber.

References Cited in the file of this patent

UNITED STATES PATENTS

| Number | Name | Date |
|---|---|---|
| 1,110,671 | Cobb | Sept. 15, 1914 |
| 1,674,171 | Gammeter et al. | June 19, 1928 |
| 1,708,129 | Gammeter | Apr. 9, 1929 |
| 2,352,533 | Goldman | June 27, 1944 |
| 2,402,038 | Goldman et al. | June 11, 1946 |
| 2,442,948 | Bogoslowsky | June 8, 1948 |
| 2,467,999 | Stephens | Apr. 19, 1949 |
| 2,489,503 | Sampson et al. | Nov. 29, 1949 |
| 2,509,715 | Allen et al. | May 30, 1950 |
| 2,571,717 | Howald et al. | Oct. 16, 1951 |
| 2,629,894 | Boggs | Mar. 3, 1953 |